(No Model.)

M. SPRING.
ARTIFICIAL LEG JOINT.

No. 540,764. Patented June 11, 1895.

C.

WITNESSES
Marcus Levé
Horace D. T. Ranlett

INVENTOR
Menzo Spring
by A. H. Ste Marie.
atty.

UNITED STATES PATENT OFFICE.

MENZO SPRING, OF SAN FRANCISCO, CALIFORNIA.

ARTIFICIAL-LEG JOINT.

SPECIFICATION forming part of Letters Patent No. 540,764, dated June 11, 1895.

Application filed April 24, 1894. Serial No. 508,849. (No model.)

*To all whom it may concern:*

Be it known that I, MENZO SPRING, a citizen of the United States, and a resident of the city and county of San Francisco, State of California, have invented certain new and useful Improvements in Hinge-Joints, of which the following is a specification.

This invention is an improvement on the patent previously granted to me by the Government of the United States for a hinge-joint, No. 315,566, bearing date April 14, 1885. In that patent joint, I made use of interlocking annular disks or plates which were united by a pivot formed of a tubular piece or hollow screw engaged by an externally-threaded screw both having enlarged conical heads of same diameter and surrounded at the stem portion by a straight-cut expansible ring set within the innermost plate, the ring being expanded by a side wedge caught between the heads of the two screws. In the present improvement, I employ a ring with inner beveled edges and substitute for the side wedge two oppositely-running conical hollow wedges, which bear directly upon the beveled edges of the ring, the two screws being used to drive the wedges toward each other and operating indirectly to expand the ring. These and other changes of construction, hereinafter fully set forth, tend to make a superior joint, which is the object of my improvement, and will now be described in detail.

Figure 1:
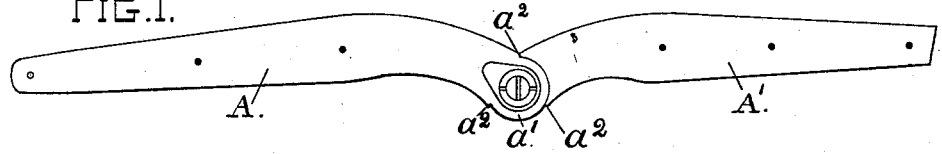
Figure 2:
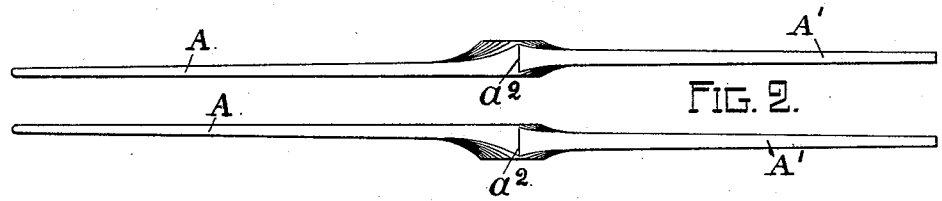
Figure 3:
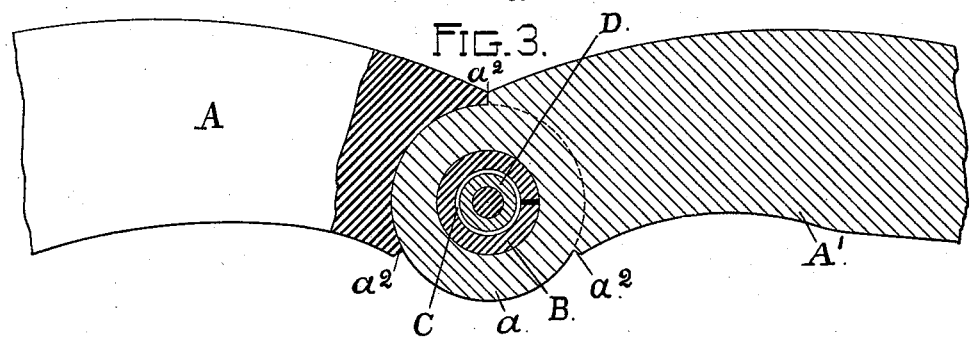
Figure 4:
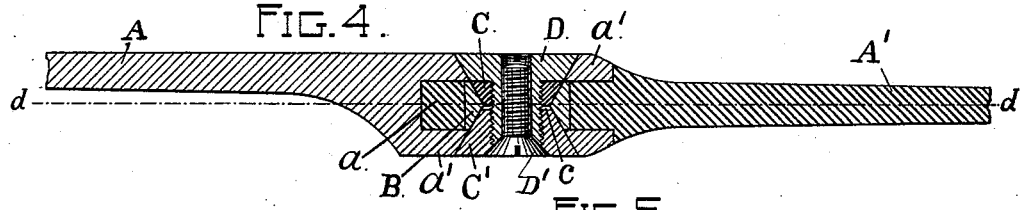
Figure 5:
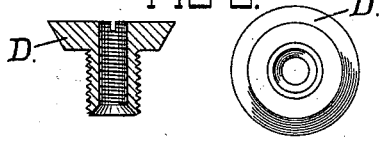
Figure 6:
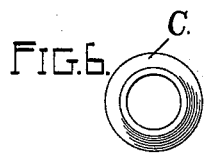
Figure 7:
Figure 7:
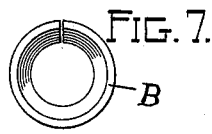
Figure 8:
Figure 9:

Referring to the drawings hereunto annexed for a detailed description of my invention, Figure is a side view of a joint specially made for artificial legs. Fig. 2 gives edge views of a set of joints of the same. Fig. 3 is a broken sectional side view made on an enlarged scale, the sectional part of it being taken from line $d\ d$ of Fig. 4. Fig. 4 is a longitudinal section. Figs. 5 to 9, inclusive, are detail views of certain parts employed in making the hinge-joint, Fig. 5 representing a sectional elevation and under plan view of an internally-threaded hollow screw, Fig. 6 giving similar views of a conical wedge driven by said screw, Fig. 7 illustrating an expansible ring, both in plan and section, Fig. 8 being a sectional elevation of another conical wedge, and Fig. 9 an elevation of a check-screw.

The same letters of reference are used to indicate the same parts throughout all the views.

Let A A' represent two bars designed to be united by a hinge-joint made according to the principle of my invention. I form the opposite ends of these bars into plates $a\ a'$, which are perforated and preferably three in number, two on the bar A and one on the bar A', plate $a$ being inserted between plates $a'$ with which it forms a protuberant knuckle or articulation. One of the bars is set off from the center so that the swell of the knuckle is brought to one side, but the other is kept in the center, practically in line with the middle plate, as described in my said patent of April 14, 1885. The oscillatory or backward and forward movement of the knuckle takes place within the limits allowed by shoulders $a^2$ provided on each bar by the side of each plate. The perforations in the plates are of different diameter and shape, that in the central plate being larger than the others and cut straight, whereas those in the outer plates are flaring outwardly, that is beveled from their inner to their outer edge.

Within the innermost of the plate openings—in the present case, the second and central one—I place a ring B, which is cut through at one side and is therefore expansible in the sense that it can be spread out by forcing the cut ends apart. The outer surface of this ring is cut straight to conform with the inner surface of the perforation in the plate $a$, while its inner surface is beveled from the center outward on both sides so as to register with the beveled or flaring surfaces of the perforations in both the plates $a'$ when brought in between them with the plate $a$ that carries it. When so brought in, it is caught between the inner edges of the openings in the plates $a'$, which being of less diameter prevent it from getting dislodged by lateral thrust or otherwise, while the screws are removed, unless the plate $a$ be first withdrawn from between the others entirely.

The ring B is secured in place within the knuckle, and expanded when necessary in in order to overcome any loose play arising from wear, by means of oppositely-running conical wedges C C', which bear upon its beveled inner surfaces and spread it out in being driven toward each other. A small space $c$ is first allowed to intervene between the inner ends of these wedges, which afterward can be taken up, as required.

The wedges C C' are made hollow and are driven inward to expand the ring B by a hollow screw D passing through them. This screw has an external thread engaging internal threads in the wedges and is besides provided with a large flat head beveled at the sides to conform in shape with the flaring opening of the plate which receives it and adapted to bear upon the top of the wedge nearest to it. The hollow screw D is itself engaged from its inner end by an externally-threaded screw D', which acts as a check-screw and serves to lock the several parts of the joint in place. The screw D' is also provided with a flat head beveled at the sides to fit within correspondingly-beveled recesses made in the wedge next to it and in the inner end of the hollow screw. When entirely driven in, the heads of the two screws are flush with the outer surfaces of the knuckle on either side. A washer or packing may be inserted between the head of the hollow screw and the wedge under it to drive said wedge farther inward, whenever it is found expedient to take up wear and regulate the play of the joint, the ring being then expanded still more, but the outer surface of the screw-head keeping in line with that of the plate where it is fitted.

The pivot of the joint, it will be observed, is reversible, so that it can be turned end for end, according to the position which the bars A A' have to occupy with relation to the limbs of which they are to form part. If needed for amputations below the knee, the bars or joints are set in the position illustrated at Fig. 2. If required for knee-bearing legs or for amputations above the knee where wooden sockets are used, the position of the bars is reversed, and that of the pivots is changed accordingly.

Having now described my invention, what I claim as new, and desire to secure protection in by Letters Patent of the United States, is—

1. In a hinge-joint, the combination of interlocking perforated plates, an inwardly-beveled expansible ring fitted therein, a conical wedge entering said ring and acting directly upon its beveled surface, and means to operate said wedge.

2. An expansible ring having oppositely-beveled inner surfaces and conical wedges bearing directly upon said surfaces combined with interlocking perforated plates and means to hold said ring and wedges therein.

3. A hinge-joint composed of interlocking perforated plates, an expansible ring having a beveled inner surface therein, a hollow wedge adapted to expand said ring by acting directly upon its beveled surface, and a screw to operate said wedge.

In testimony whereof I affix my signature in presence of two witnesses.

MENZO SPRING. [L. S.]

Witnesses:
A. H. STE. MARIE,
CHAS. D. WHEAT.